Dec. 22, 1970     R. G. KISCHER     3,548,417
HEART VALVE HAVING A FLEXIBLE WALL WHICH ROTATES
BETWEEN OPEN AND CLOSED POSITIONS
Filed Sept. 5, 1967     2 Sheets-Sheet 1
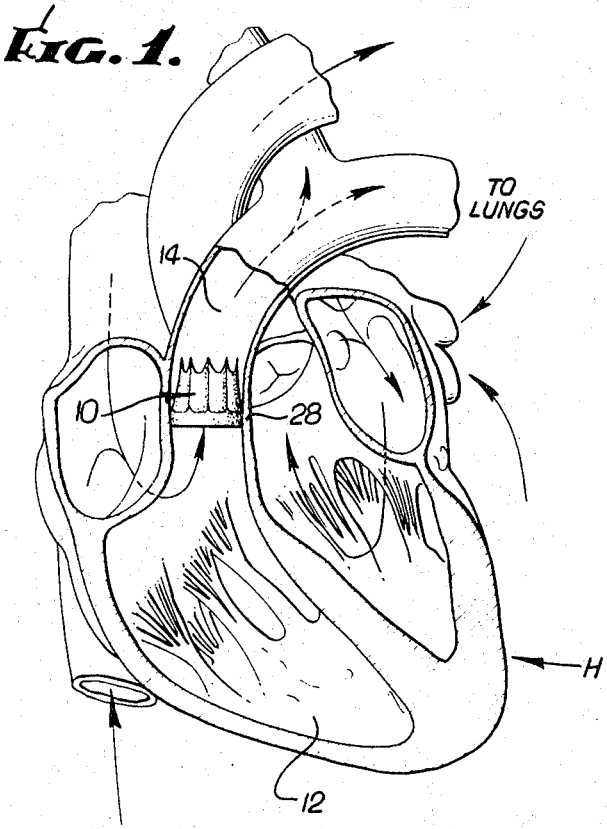
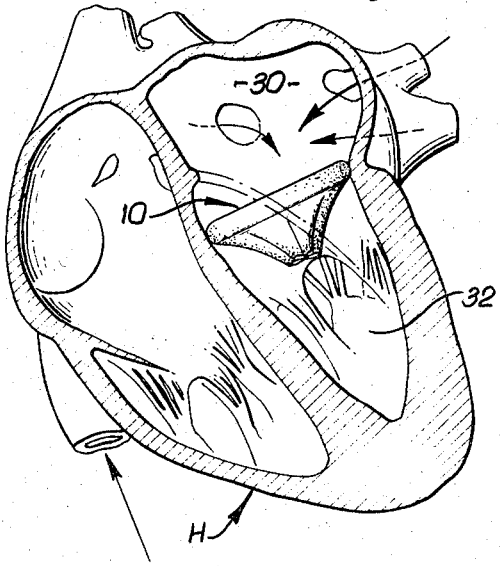
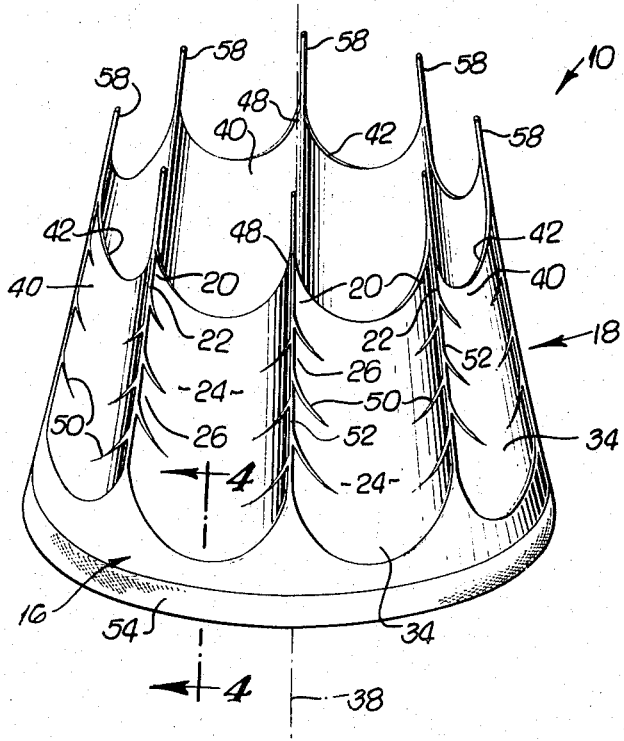
INVENTOR.
RONNIE G. KISCHER
By White & Haefliger
ATTORNEYS.

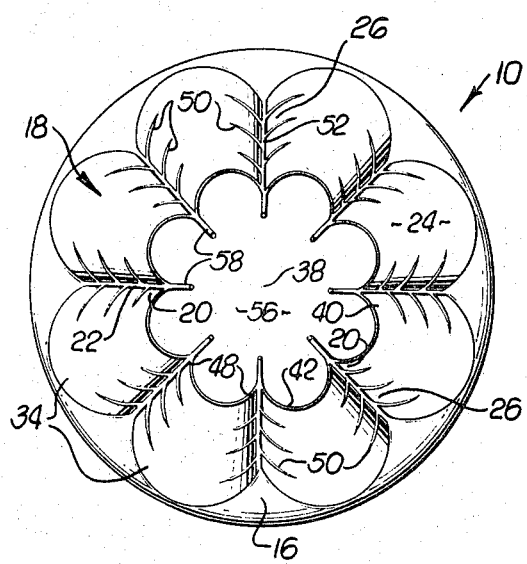
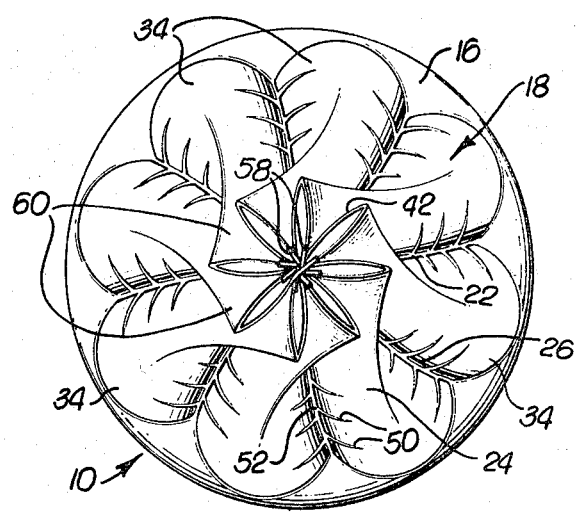
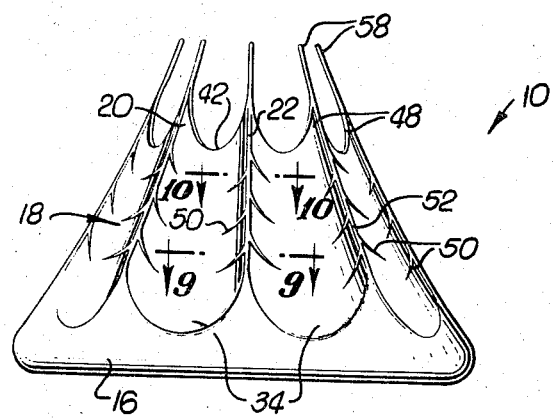
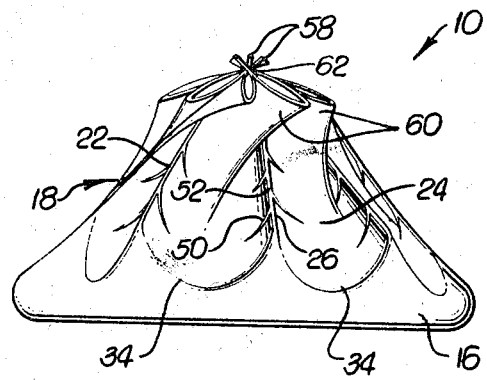
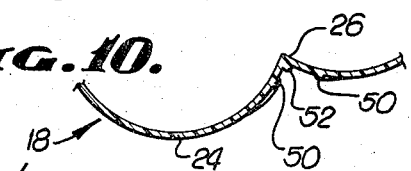
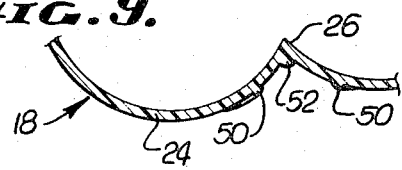

United States Patent Office 3,548,417
Patented Dec. 22, 1970

3,548,417
HEART VALVE HAVING A FLEXIBLE WALL WHICH ROTATES BETWEEN OPEN AND CLOSED POSITIONS
Ronnie G. Kischer, La Habra, Calif.; Jane N. Kischer, widow of said Ronnie G. Kischer, deceased
Filed Sept. 5, 1967, Ser. No. 665,325
Int. Cl. A61f *1/22;* A16k *15/14*
U.S. Cl. 3—1                                                    13 Claims

ABSTRACT OF THE DISCLOSURE

A cardiac valve having a winding and unwinding movement between open and closed positions and including thin sheet material extending about a central axis and having at one time a first position in which the material is openly extended to define a blood passage and at another time a second position in which the material is collapsed and pleated and partially rotated about the central axis to close the passage for blocking reverse flow of blood.

BACKGROUND OF THE INVENTION

Field of the invention

This invention is concerned with prosthetic devices and particularly with valves useful in replacement of natural heart valves. As is known the human heart includes four cavities. Communication therewith is controlled by valves specifically the aortic, tricuspid, mitral and pulmonary valves. These valves are remarkably similar in construction consisting of triangular cusps or leaflets, the free ends of the mitral and tricuspid valves being supported by delicate tendons, the chordae tendinae, which insert into the papillary muscles, thus to prevent wrong way opening of these antrioventricular valves. Defective natural valves, those which have been narrowed or surface roughened or which close incompletely, are desirably replaced. For successful replacement, the extremely critical opening and closing characteristics of the healthy natural valve must be approximated as closely as possible.

Prior art

Prior developments in the art may be classified as either blood passing valves intended for use in mechanical "heart" pumps used in surgery or heart valves properly so-called, i.e. those attached to and operative within the heart. It is with the latter group that the present invention is concerned. In U.S. Pat. 3,130,418 to Head, et al., a specially woven and plastic impregnated valve device is disclosed. In U.S. Pat. 3,197,788 to Segger a valve device is described which, like the Head, et al. invention, tried to simulate the action of the natural valve by a physical approximation of the natural valve cusps. U.S. Pat. 3,263,239 to Edwards et al., utilizes the well known ball valve and cooperating seat combination to accomplish the check valve function of the natural valves.

In the present invention an entirely different type of valve is produced. The design is predicated on a simulation of the function of the natural heart valve, without imitation of the structure of the natural valves, the simulation being found particularly in the aspect of positive and complete closure following pumping discharge of blood therethrough without mechanical abuse of the blood.

SUMMARY OF THE INVENTION

It is the major object of the present invention to provide a prosthetic heart valve suitable for the replacement of any of the natural heart valves. It is a further object to achieve opening and closing of the valve with a novel motion insuring reliable and positive opening and closure action for an indefinitely long period.

In general, the invention may be succinctly described as a valve comprising a thin sheet material defining a through passage, flow through which is controllable by a winding pleated or accordion fold of the material.

In particular, the invention provides a cardiac valve comprising thin sheet material impervious to blood and resistant to body fluids and which extends about a central axis, thus to define an open passage to pass blood; the material at another time has a second position in which it is collapsed to form pleats and is also at least partially rotated about the central axis. In the second position the material closes the passage and blocks reverse flow of blood therethrough.

Collapse in the desired manner is facilitated by provision of stiffening support for the sheet material in constraining relation to induce the material to rotate in its movement between its first and second position. Also, structure may be provided for implanting the valve in the heart, such as a base ring from which the sheet material may extend in the direction of natural blood flow.

In certain preferred embodiments, the sheet material is frusto-conical when open and is provided with plural ribs which extend generally longitudinally of the material and in planes extending axially of the conical material. Such ribs may be formed integrally with the wall forming sheet material as thickened areas thereof and serve to define circumferentially alternating relatively flexible and relatively rigid wall portions, the former to follow and the latter to lead in the winding collapse of the valve material to produce overlapping, pleated flaps.

The relative size of the rigid wall portions is controllable by provision in the ribs of webs extending away from midribs, the webs having differential lengths as will be explained. Also, the wall may have plural cusps opposite its base which move helically on opening and closing movement of the valve and from which the midribs may proceed directionally toward the base. The latter may be reinforced against radial crushing by ventricular contractions, such reinforcement being spaced from the rib lower termini to facilitate the winding movement of the sheet material above the base, relative to the base and about the valve longitudinal axis.

BRIEF DESCRIPTION OF THE DRAWINGS

In the drawings:

FIG. 1 is a sectional view of a human heart showing the valve device of the present invention in open position in the place of the pulmonary valve;

FIG. 2 is a view like FIG. 1 showing the present valve device in closed position in the place of the mitral valve;

FIG. 3 is an enlarged perspective view of the artificial heart valve shown in FIG. 1;

FIG. 4 is an enlarged view in section taken along line 4—4 in FIG. 3;

FIG. 5 is a plan view of the valve shown partially closed;

FIG. 6 is a view in elevation of the partially closed valve shown in FIG. 5;

FIG. 7 is a view like FIG. 5 showing the valve fully closed;

FIG. 8 is a view like FIG. 6 showing the valve fully closed;

FIG. 9 is a sectional view of the valve wall taken along line 9—9 in FIG. 6; and FIG. 10 is a view like FIG. 9 taken along line 10—10 in FIG. 6.

DESCRIPTION OF THE PREFERRED EMBODIMENTS

With reference to the attached drawings in which one embodiment of the present invention is depicted, FIG. 1 shows the present prosthetic valve device 10, in open condition, substituted for the natural pulmonary valve, between the right ventricle 12 and the pulmonary artery 14 for controlling flow of blood from the heart, H, to the lungs and avoiding regurgitation or partial return flow from the artery to the right ventricle. The heart contraction pumps blood through the valve which can be seen to include (FIG. 3) a base portion 16 and a wall portion 18 having plural cusps 20 from which ribs 22 extend directionally toward the base circumferentially dividing the wall into relatively flexible sections 24 and relatively rigid sections 26. The valve is sutured at the base 16 to the artery wall 28 as by thread extending about or through the base, and typically about reinforcement 54 as seen at 100 in FIG. 4.

The versatility of the present valve device is illustrated by its substitution in FIG. 2 for the mitral valve. This location is more critical than the pulmonary valve position and thus requires extreme precision and reliability in operation when mounted as shown across the relatively wide opening between the left atrium 30 and the left ventricle 32, illustrated in the closed position.

With particular reference to FIG. 3 the cardiac valve 10 shown may be described as frusto-conical and composed of plural conical segments 34 which abut at spaced locations about the valve circumference to provide a wall 18 extending about a central axis 38. The segments 34 are relatively wider at their bottoms adjacent the base 16 than at their upper edge portions 40. The edge portion 40 of each segment 34 terminates in an arcuate edge 42 giving the valve a scalloped appearance with the circularly arranged peaks or cusps 20 at the abutment of adjacent segments 34.

The wall 18 has relatively flexible portion 24 formed centrally of segments 34 and relatively rigid portion indicated at 26 and corresponding generally to the line of abutment between adjacent segments. Stiffening support may be provided at the junctions between segments 34 in the form of ribs 22 which as shown proceed directionally from cusps 20 downward toward the base portion 16, which base portion the ribs may or may not meet, depending upon collapsing characteristics desired. The ribs 22 may also project beyond the peaks 48 of the cusps 20 as shown in FIG. 3.

The ribs 22 may be of any material compatible with the use environment of the valve such as stainless steel or high modulus plastic, secured by adequate means to the wall 18. Preferably, ribs 22 are formed integrally with the molded plastic wall 18 by providing selectively increased thickness in the wall according to a predetermined pattern to provide a localized increase in stiffness, which will be generally proportionate to the thickness increase. In order better to control areas of the adjacent segments 34 beyond the immediate junction thereof, the ribs 22 are provided with webs 50 which radiate preferably in dendroid array from the central portions or midribs 52 of the ribs. The webs 50 generally are base directed, i.e., proceed toward the base 16 of the valve, regardless of the in-heart orientation of the valve device 10. The function of the webs 50 is to provide stiffening fingers outward from the midrib 52 to facilitate the desired mode of collapse of the wall 18. Accordingly, the webs 50 will be relatively longer progressively as they increase in proximity to the base 16 along the midrib 52 due to the greater circumference of the valve wall 18 proximate the base.

Ribs 22 are tapered to a minimum cross-section adjacent the cusps 20 and as such are sometimes termed banners. Webs 50 are similarly tapered, outward from midribs 52 to extinction on the wall 18. The wall itself is also preferably tapered frusto-conically upwardly from the base 16, the taper of the wall 18 and a rib 22 being shown in the fragmentary views of FIGS. 9 and 10. The maximum and minimum thicknesses of the wall 18 and the ribs 22 and webs 50, as well as their taper, will be selected with consideration for the specific heart valve to be produced, the relative stiffness of the fabricatory material and the orientation and strain factors likely to be encountered in molding or otherwise shaping the valve.

With reference to FIG. 4, the base 16 may typically be ring like or toroidal, and the wall 18 may extend from the outer edge thereof. The base 16 may be formed as an annular ring apart from the wall 18 and fastened thereto or may, in preferred practice, be integrally molded with or to the wall 18 in the valve manufacturing operation. Reinforcement of the base 16 against radial crushing may be desirable, particularly where the valve is integrally molded and intended for use as an aortic valve. A preformed ring of metal, plastic or a combination thereof may be used, or fibers, preferably woven, e.g., Dacron cloth may be employed for reinforcement, and as an example an annular preformed Dacron cloth 54 is shown embedded in the periphery of base 16 in FIG. 4.

With reference now to FIGS. 5-8, the movement of the valve of the present invention between open and closed positions will be described. Noted above was the requirement in a heart valve for fail-proof actuation of the valve by pressure of the blood on either side thereof and with minimum mechanical abuse of the blood. It is a feature of the present valve device that opening and closing movement is effected over a very long surface relative to the diameter of the valve. This permits lowering of pressure per unit of area in closing the valve and minimizes risk of blood damage.

The present valve movement is a winding movement, that is the valve 10 is at least partially rotated about its axis; the cusps 20 of the valve traveling helical paths. The slack or relatively flexible portions 24 of the valve wall 18 fold on themselves between the relatively rigid wall portions 26 which thus converge on one another so that adjacent flexible portions 24 double over and overlap with one another to a greater or lesser extent as the valve wall 18 is flattened.

In FIGS. 5 and 6, the normal open position of the valve 10 is shown. Cone segments 34 of the wall 18 are coaxial with the axial plane of the valve and define a valve passage 56 into which ends 58 of ribs 22 project slightly. The valve position shown in FIGS. 5 and 6 is the result of a pressure differential between the interior and exterior of the valve 10 in favor of the valve interior as is the case for example for an aortic valve during a pumping contraction of the left ventricle. Upon cessation of the pumping, the back pressure produced by the blood pumped through the valve tends to cause regurgitation or blood return, quickly reversing the pressure differential in favor of the valve exterior. At this point the valve 10 must close, or else already pumped blood must be repumped imposing in all likelihood an intolerable burden on the heart.

In the present valve closure is quick and sure. The shift of incremental pressure to the exterior of valve 10 immediately causes an inward collapse of the valve wall 18. Because the wall is not uniformly collapsible owing to the circularly alternate flexible and rigid portions 24 and 26, the wall 18 tends to wind either right or left in collapse, depending on the predisposition built into the wall by arrangement of the ribs 22 or other selective stiffening feature, relative to the base. The base 16 remains stationary and the wall 18 rotates with respect thereto and at least partially about the axis 38 of the wall.

With the reduction in the height of the wall 18 occasioned by the collapse, the flexible wall portions 24 move from between the rigid portions 26 forming flaps 60 projecting inwardly or outwardly and preferably outwardly as shown. Continued exertion of reverse flow pressure on the flaps 60 forces the flaps to lie flat, upon one another to an extent dependent on the concavity of the cone segments 34 which is a matter of design.

On a further pumping contraction of the heart, the inner valve pressure will again exceed the outer and the flaps 60 will reform the cone segments 34 as the ribs 22 move helically and apart to provide the valve opening 56.

It will be seen in FIGS. 7 and 8 that the rib ends meet at a common point 62 lying on the axis 38 and the flaps 60 resemble pleats or accordion folds.

The present valve device can be formed of many materials known to the art including olefin polymers and copolymers, polyamides, polyesters, silicones and the like solely or in combination with other materials of a plastic or metallic nature for specific properties, e.g., rigidifying the selected areas of the valve wall 18.

The present design is advantageous in being readily formable in a single molding operation, with mold insert if desired, e.g., the preformed annular cloth 54.

What is claimed is:

1. Cardiac valve comprising a generally annular base carrying means for securing the valve in a heart blood passageway and a frusto-conical wall of flexible sheet material extending from the base and about a longitudinal axis, said wall having circularly alternating relatively rigid and relatively flexible longitudinally extended portions to rotate relative to the base about said axis in response to relatively greater interior pressure in the valve to a first position in which the wall is extended openly relative to said axis to define an open passage to pass blood, and in response to relatively greater exterior pressure on the valve to a second position in which the wall is collapsed by the relatively rigid wall portions converging on one another and the relatively flexible wall portions therebetween folding on themselves to form pleats to close said passage for blocking reverse flow of blood therethrough.

2. Cardiac valve according to claim 1 including also plural circularly spaced stiffening support means carried in local constraining relation with said sheet material to define said rigid portions and to induce said rotation in response to movement of the wall material from said first to said second positions.

3. Cardiac valve according to claim 2 in which each of said stiffening support means extends along the sheet material in the plane of said axis when the wall is in said first position.

4. Cardiac valve according to claim 1 including also cloth secured to said base to define said means for securing said valve to the heart.

5. Cardiac valve according to claim 2 in which said stiffening support means comprise ribs and in which said flexible portions between said ribs are cone segments.

6. Cardiac valve according to claim 5 in which said base is rigid relative to said sheet material.

7. Cardiac valve according to claim 5 including also midribs and plural webs extending from said ribs in dendroid arrangement.

8. Cardiac valve according to claim 7 in which said ribs are formed integrally with said sheet material.

9. Cardiac valve according to claim 5 in which said ribs are spaced from said base.

10. Cardiac valve according to claim 1 in which said wall includes plural terminal cusps at the opposite end of the wall from the base.

11. Cardiac valve according to claim 10 in which said relatively rigid portions comprise thickened areas forming ribs in said wall and include raised midribs extending directionally from said cusps toward said base and raised webs extending away from said midribs and at opposite sides thereof, webs closer to said base being longer than webs closer to said cusps.

12. Cardiac valve according to claim 11 in which said base and wall consists of integrally molded plastic material.

13. Cardiac valve according to claim 12 in which said base includes reinforcement means to resist radial crushing forces.

14. Cardiac valve according to claim 14 in which said base includes reinforcement structure to resist radial crushing forces.

References Cited

UNITED STATES PATENTS

| | | | |
|---|---|---|---|
| 2,662,724 | 12/1953 | Kravagna | 137—525.1 |
| 2,682,057 | 6/1954 | Lord | 3—1 |
| 3,047,013 | 7/1962 | Baumbach | 137—525.1 |
| 3,118,468 | 1/1964 | Bochan | 137—525.1 |
| 3,197,788 | 8/1965 | Segger | 3—1 |
| 3,279,996 | 10/1966 | Long et al. | 3—1HV |
| 3,416,562 | 12/1968 | Freeman | 3—1X |

FOREIGN PATENTS

| | | | |
|---|---|---|---|
| 515,372 | 8/1955 | Canada | 137—525 |

RICHARD A. GAUDET, Primary Examiner

R. L. FRINKS, Assistant Examiner

U.S. Cl. X.R.

137—525.1

UNITED STATES PATENT OFFICE
CERTIFICATE OF CORRECTION

Patent No. 3,548,417  Dated December 22, 1970

Inventor(s) Ronnie G. Kischer

It is certified that error appears in the above-identified patent and that said Letters Patent are hereby corrected as shown below:

Column 6, lines 26 to 28, cancel "14. Cardiac valve according to claim 14 in which said base includes reinforcement structure to resist radial crushing forces.".

Signed and sealed this 1st day of June 1971.

(SEAL)
Attest:

EDWARD M. FLETCHER, JR.
Attesting Officer

WILLIAM E. SCHUYLER, JR.
Commissioner of Patents